United States Patent
Kuo et al.

(10) Patent No.: US 10,269,310 B2
(45) Date of Patent: Apr. 23, 2019

(54) DISPLAY PANEL

(71) Applicant: AU OPTRONICS CORPORATION, Hsin-chu (TW)

(72) Inventors: Chih-Che Kuo, Hsin-chu (TW); Yi-Jheng Wong, Hsin-chu (TW); Chun-I Wu, Hsin-chu (TW); Chun-Han Tai, Hsin-chu (TW); Yi-Hsiang Lai, Hsin-chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 15/666,953

(22) Filed: Aug. 2, 2017

(65) Prior Publication Data

US 2018/0182311 A1 Jun. 28, 2018

(30) Foreign Application Priority Data

Dec. 27, 2016 (TW) .............................. 105143445 A

(51) Int. Cl.
*G02B 6/28* (2006.01)
*G02B 6/34* (2006.01)
(Continued)

(52) U.S. Cl.
CPC .......... *G09G 3/3473* (2013.01); *G02B 6/4215* (2013.01); *G02B 6/4295* (2013.01);
(Continued)

(58) Field of Classification Search
CPC .................... G02B 6/12007; G02B 6/2848; G02B 6/3524; G02B 6/3528; G02B 6/3534;
(Continued)

(56) References Cited

U.S. PATENT DOCUMENTS 8,081,177 B2 12/2011 White et al.
9,547,191 B2 1/2017 Hibayashi et al.
(Continued)

FOREIGN PATENT DOCUMENTS

CN 103176327 A * 6/2013 ........... G02F 1/0147
CN 104714427 A * 6/2015 ............... G02B 6/35
(Continued)

OTHER PUBLICATIONS

Office Action issued by (TIPO) Intellectual Property Office, Ministry of Economic Affairs, R. O. C. dated Jun. 7, 2017 for Application No. 105143445, Taiwan.

*Primary Examiner* — Michael J Eurice
(74) *Attorney, Agent, or Firm* — Tim Tingkang Xia, Esq.; Locke Lord LLP

(57) ABSTRACT

A display panel includes waveguides, wires and a pixel array. The pixel array includes a plurality of pixel units. The pixel units are arranged in a plurality of columns and a plurality of rows. Each pixel unit includes a pixel electrode, a light filtering unit, and a photo transistor. The light filtering unit is coupled to one of the waveguides. The photo transistor is electrically connected to the pixel electrode and one of the wires, and is coupled to the light filtering unit. The waveguide transmits a light control signal. Each wire transmits an electric control signal. The light filtering unit is configured to receive a sub control signal from the waveguides to which the light filtering unit is coupled and filter out a specific optical signal according to the received sub control signal as an input signal of the photo transistor.

10 Claims, 11 Drawing Sheets

(51) Int. Cl.
  *G09G 3/34* (2006.01)
  *G09G 3/20* (2006.01)
  *G02B 6/42* (2006.01)
  *G02B 6/12* (2006.01)
  *G02B 6/124* (2006.01)

(52) U.S. Cl.
  CPC ....... *G09G 3/2003* (2013.01); *G02B 6/12004* (2013.01); *G02B 6/124* (2013.01); *G02B 6/12007* (2013.01); *G02B 6/4214* (2013.01); *G02B 2006/12107* (2013.01); *G09G 2300/0465* (2013.01); *G09G 2300/0814* (2013.01)

(58) Field of Classification Search
  CPC ...... G02B 6/3546; G02B 6/3556; G09G 3/00; H01S 3/05; H01S 3/07; H01S 3/0604; H01S 5/2031
  See application file for complete search history.

(56) References Cited

U.S. PATENT DOCUMENTS

| | | | |
|---|---|---|---|
| 2002/0039470 A1* | 4/2002 | Braun | G02B 6/12002 385/50 |
| 2002/0081055 A1* | 6/2002 | Painter | B23K 26/0823 385/2 |
| 2002/0191889 A1* | 12/2002 | Lucero | G02B 6/12004 385/16 |
| 2003/0068131 A1* | 4/2003 | Gunn, III | B82Y 20/00 385/40 |
| 2003/0217804 A1* | 11/2003 | Guo | B82Y 10/00 156/230 |
| 2004/0087049 A1* | 5/2004 | Gill | G02B 6/12007 438/31 |
| 2004/0150268 A1* | 8/2004 | Garito | B82Y 5/00 385/50 |
| 2004/0258347 A1* | 12/2004 | Gothoskar | G02B 6/12007 385/14 |
| 2005/0271324 A1* | 12/2005 | Nielson | G02B 6/12007 385/39 |
| 2006/0023997 A1* | 2/2006 | Almeida | G02B 6/12007 385/27 |
| 2006/0072875 A1* | 4/2006 | Bhagavatula | G02B 6/12007 385/30 |
| 2006/0222286 A1* | 10/2006 | Spoonhower | G02B 6/12004 385/15 |
| 2007/0025410 A1* | 2/2007 | Agarwal | B82Y 20/00 372/94 |
| 2007/0071386 A1* | 3/2007 | Digonnet | B82Y 20/00 385/32 |
| 2007/0086180 A1* | 4/2007 | Sotoyama | G02B 6/02033 362/84 |
| 2007/0127861 A1 | 6/2007 | de Almeida et al. | |
| 2007/0258677 A1* | 11/2007 | Chigrinov | G02B 6/12007 385/15 |
| 2008/0193133 A1* | 8/2008 | Krug | G02B 6/12007 398/83 |
| 2009/0220184 A1* | 9/2009 | Goldring | B82Y 20/00 385/2 |
| 2009/0238515 A1* | 9/2009 | Fattal | G02B 6/12007 385/30 |
| 2009/0245296 A1* | 10/2009 | Santori | G02B 6/12007 372/20 |
| 2009/0263078 A1* | 10/2009 | Hosomi | G02B 6/12004 385/14 |
| 2009/0297094 A1* | 12/2009 | Hochberg | B82Y 20/00 385/14 |
| 2011/0019957 A1* | 1/2011 | Alameh | G02F 1/095 385/6 |
| 2012/0033294 A1* | 2/2012 | Beausoleil | G02B 6/12004 359/341.3 |
| 2013/0034323 A1* | 2/2013 | Costache | G02F 1/035 385/8 |
| 2013/0156369 A1* | 6/2013 | Park | G02B 6/12007 385/14 |
| 2014/0160061 A1* | 6/2014 | Kim | G02F 1/13338 345/174 |
| 2014/0354607 A1 | 12/2014 | Sheu | |
| 2015/0378183 A1* | 12/2015 | Pernice | G02F 1/365 385/1 |

FOREIGN PATENT DOCUMENTS

| | | | |
|---|---|---|---|
| EP | 0542579 A1 * | 5/1993 | ............ G02F 1/135 |
| EP | 0542579 A1 | 5/1993 | |
| JP | H05158065 A | 6/1993 | |
| JP | 2007256814 A * | 10/2007 | |
| TW | 201117374 A1 | 5/2011 | |

\* cited by examiner

DISPLAY PANEL

CROSS-REFERENCE TO RELATED PATENT APPLICATION

This non-provisional application claims priority to and benefit of, under 35 U.S.C. § 119(a), Patent Application No. 105143445 filed in Taiwan R.O.C. on Dec. 27, 2016. The entire contents of the above identified application is incorporated hereby by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD

The present invention relates to a display panel, and in particular, a display panel that transmits a signal by using light.

BACKGROUND

Display panels in the past generally transmit information by using electric signals, that is, drive columns or rows of a pixel array by using voltages or currents that carry drive data. Such architecture facilitates performing, by a user, addressing control on the pixel array. However, with the increase of resolution and a panel size, distances among elements in a display panel are also reduced, and a lot of non-ideal effects are generated. For example, the increase of parasitic capacitors and parasitic resistors of an active element substrate in a display panel causes problems, such as signal attenuation or signal delay, and consequently, output or read signals are incorrect. In addition, the increase of solution causes the increase of cables, and also makes peripheral fan-out pin space limited.

Current solutions, for example, are adjusting a length-width ratio of a transistor element or increasing a width of a pixel electrode. However, at the same time, an area occupied by pixel circuit elements is increased, and therefore a pixel aperture opening ratio is reduced or a bezel width is increased, and new problems are also caused while original problems are solved.

SUMMARY

One aspect of the present invention discloses a display panel, comprising waveguides, wires, and a pixel array. The waveguides are respectively configured to transmit a light control signal. Each of the light control signals comprises at least one sub control signal, and the at least one sub control signal corresponds to at least one wavelength range. The wires are respectively configured to transmit an electric control signal, wherein the wires and the waveguides are in staggered arrangement. The pixel array comprises pixel units. The pixel units are arranged in a plurality of columns and a plurality of rows. Each of the pixel units comprises a pixel electrode, a light filtering unit, and a photo transistor. The light filtering unit is coupled to one of the waveguides. The light filtering unit is configured to receive a sub control signal from the waveguide to which the light filtering unit is coupled and filter out a specific optical signal according to the received sub control signal as an input signal of the photo transistor. The photo transistor comprises a first end, a second end, and a third end. The first end is electrically connected to the pixel electrode; the second end is electrically connected to one of the wires; and the third end is coupled to the light filtering unit. The photo transistor is electrically connected to the pixel electrode.

Based on the above, the embodiment of the present invention provides a display panel. A photo transistor and a light filtering unit are provided in each pixel unit of the display panel. In this way, a waveguide can be used as a scan line or a data line of the display panel, that is, a drive signal or a data signal of the display panel can be transmitted by means of light. In this way, a quantity of wires of the display panel can be reduced, so that an effect of non-ideal coupling among electric elements is avoided. On the other hand, by converting signals that originally correspond to a plurality of electric channels into optical signals and transmitting same on a common optical channel, a quantity of signal lines is further reduced, and problems such as limited peripheral fan-out space and increase of a bezel width are solved.

Both the foregoing general description about the present invention and the following detailed description about the embodiments are exemplary and are intended to explain the principles of the present invention, and provide further explanation of the claims of the present invention.

These and other aspects of the present disclosure will become apparent from the following description of the preferred embodiment taken in conjunction with the following drawings, although variations and modifications therein may be effected without departing from the spirit and scope of the novel concepts of the present disclosure.

BRIEF DESCRIPTION OF THE DRAWINGS

The accompanying drawings illustrate one or more embodiments of the present disclosure and together with the written description, serve to explain the principles of the present disclosure. Wherever possible, the same reference numbers are used throughout the drawings to refer to the same or like elements of an embodiment, and wherein.

DETAILED DESCRIPTION

The detailed features and advantages of the present invention are described below in great detail through the following embodiments, and the content of the detailed description is sufficient for persons skilled in the art to understand the technical content of the present invention and to implement the present invention there accordingly. Based upon the content of the specification, the claims, and the drawings, persons skilled in the art can easily understand the relevant objectives and advantages of the present invention. The following embodiments further describe the viewpoints of the present invention, but are not intended to limit the scope of the present invention in any way.

Figure 1:
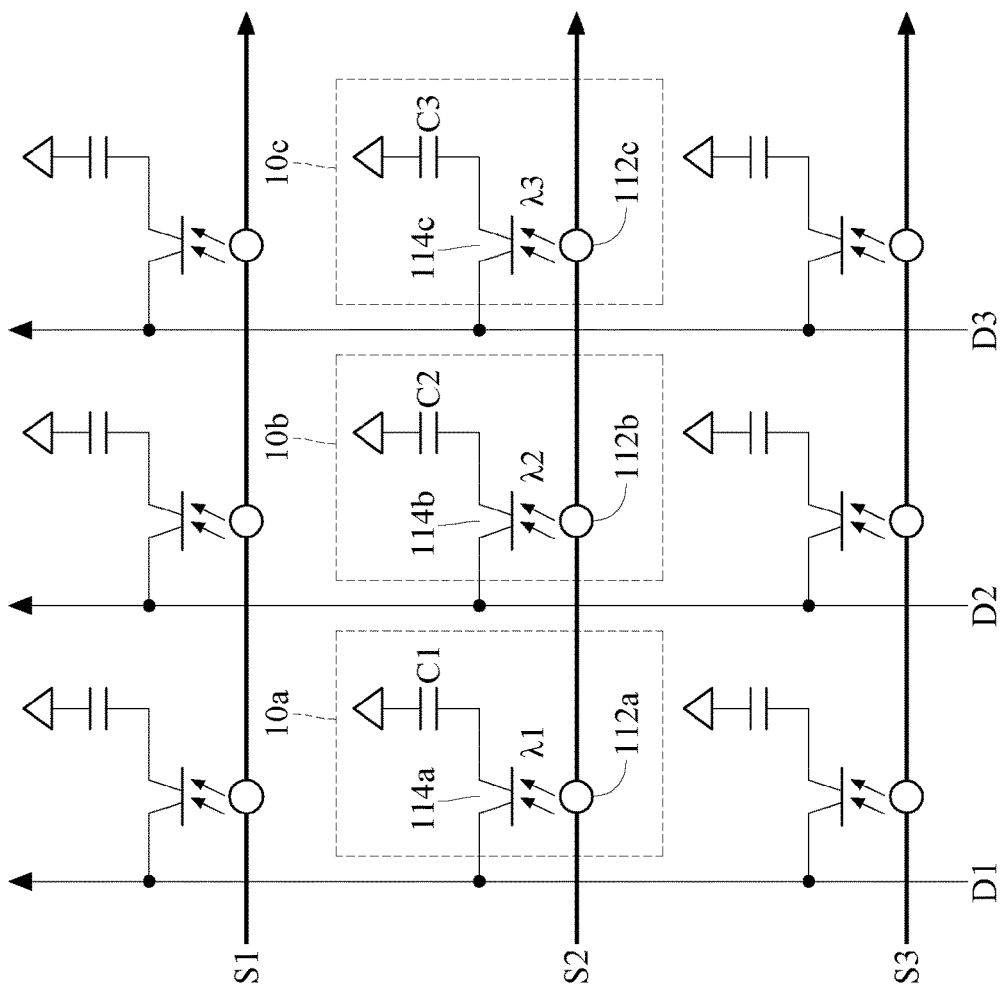
FIG. 1 is a schematic structural diagram of a display panel according to an embodiment of the present invention.

Referring to FIG. 1, FIG. 1 is a schematic structural diagram of a display panel according to an embodiment of the present invention. A display panel 1 comprises a plurality of scan lines, a plurality of data lines, and a pixel array, which comprises a plurality of pixel units. For briefness of narration, scan lines S1, S2, and S3, data lines D1, D2, and D3, and some pixel units are described in FIG. 1, and pixels units 10a to 10c are marked in FIG. 1. As regards the pixel unit 10a, the pixel unit 10a comprises a pixel electrode, a light filtering unit 112a, and a photo transistor 114a. A capacitor C1 in FIG. 1 is an equivalent capacitor formed by the pixel electrode, and is subsequently called a pixel capacitor C1. The light filtering unit 112a is coupled to the scan line S2. The photo transistor 114a comprises a first end, a second end, and a third end. The first end of the photo transistor 114a is electrically connected to the pixel capacitor C1. The second end of the photo transistor 114a is electrically connected to the data line D1, and the third end of the photo transistor 114a is coupled to the light filtering unit 112a. In embodiments of a first type, as shown in FIG. 1, the scan lines in the display panel 1 are waveguides, and the data lines are wires.

In the embodiments of the first type, waveguides are used as scan lines. That is, the scan lines S1, S2, and S3 are waveguides, which are configured to transmit light control signals. In this embodiment, each of the scan lines is configured to transmit one of a plurality of light control signals; each light control signal comprises at least one sub control signal, and the at least one sub control signal corresponds to at least one wavelength range. From another aspect, each light control signal corresponds to one sub control signal or is formed by superimposing a plurality of sub control signals. The light control signal may be visible light or invisible light, and is not limited herein. In the embodiments of this type, data lines are a plurality of wires. Materials of the wires are suitable to be conductive, and each of the wires is configured to transmit one of a plurality of electric control signals. In this embodiment, the electric control signal, for example, carries data to be written into a pixel.

When the light control signal is visible light, the photo transistor, for example, may be made of visible light photoelectric sensitive materials, and relevant materials, for example, are α-Si, μc-Si, α-SiGe, μc-SiC, α-indium gallium zinc oxides (α-IGZO), or other organic semiconductor materials or inorganic semiconductor materials that can sense visible light. When the light control signal is invisible light, the photo transistor, for example, is made of materials that can sense invisible light, and relevant materials, for example, are Si-based compound crystals, InGaAs, or other organic semiconductor materials or inorganic semiconductor materials that can sense invisible light.

Each light filtering unit is configured to obtain at least one sub control signal in a light control signal of one of waveguides. Each light filtering unit is configured to generate an optical input signal according to the obtained sub control signal to enable a photo transistor in a pixel unit. In the embodiment shown in FIG. 1, when a system provides an optical signal having a specific wavelength range to the scan line S2, the light filtering unit 112a further filters out a sub control signal having an equivalent wavelength λ1 from the optical signal; the light filtering unit 112a further generates an optical input signal according to the sub control signal having the equivalent wavelength λ1, and provides the optical input signal to the photo transistor 114a, to selectively conduct the photo transistor 114a. As stated above, the third end of the photo transistor 114a is coupled to the light filtering unit 112a. The third end of the photo transistor 114a, for example, is a control end; the photo transistor 114a is selectively conducted according to the optical input signal; and the photo transistor 114a is configured to charge the pixel capacitor C1 according to an electric control signal output by the data line D1. In an embodiment, the light filtering unit 112a directly uses the obtained sub control signal as the optical input signal.

Similarly, light filtering units 112b and 112c of pixel units 10b and 10c may also be configured to obtain a sub control signal having the equivalent wavelength λ1, and generate the optical input signal on such basis. However, in another embodiment, the light filtering unit 112b of the pixel unit 10b is configured to obtain a sub control signal having an equivalent wavelength λ2, and the light filtering unit 112c of the pixel unit 10c is configured to obtain a sub control signal having an equivalent wavelength λ3. In other words, in this embodiment, the pixel units 10a to 10c are respectively controlled by light control signals having different wavelength ranges.

Figure 2:
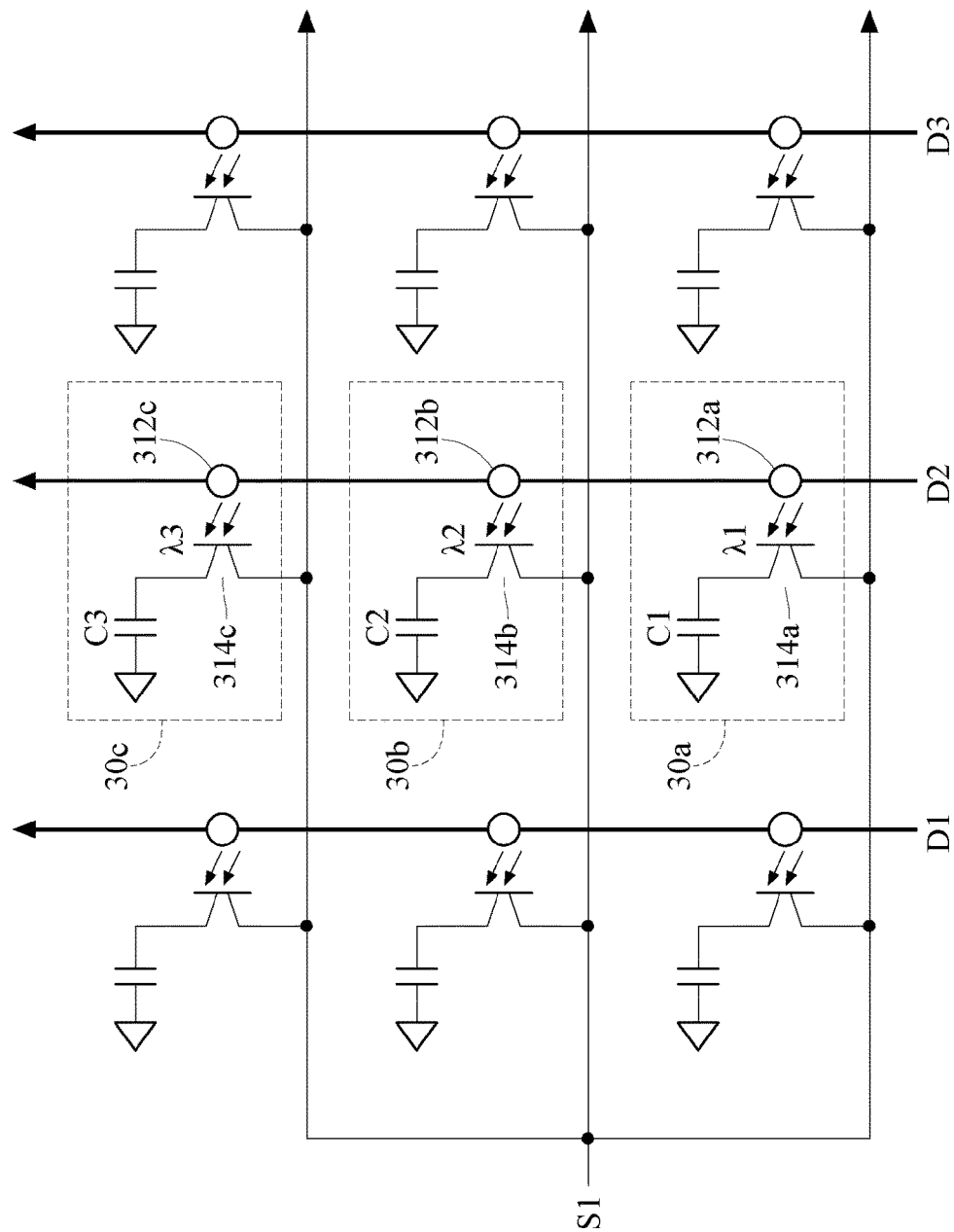
FIG. 2 is a schematic structural diagram of a display panel according to a further embodiment of the present invention.

Then referring to FIG. 2 to describe another implementation aspect of a display panel according to the present invention. FIG. 2 is a schematic structural diagram of a display panel according to a further embodiment of the present invention. Pixels arranged in 3 columns×3 rows are drawn in FIG. 2. In a drawing direction of FIG. 2, rows are horizontal and columns are longitudinal. On the other aspect, in this embodiment, data lines D1, D2, and D3 are waveguides, and a scan line S1 is a wire. In the drawing direction of FIG. 2, pixels in the columns are respectively coupled to different data lines D1, D2, and D3, and pixels in the rows are also electrically connected to the scan line S1. As regards the data line D2, a light control signal on the data line D2 comprises a plurality of sub control signals, and the sub control signals respectively correspond to different wavelength ranges; light filtering units 312a, 312b, and 312c respectively obtain corresponding sub control signals from the light control signal.

For example, a pixel unit 30a represents a red sub pixel; a pixel unit 30b represents a green sub pixel; and a pixel unit 30c represents a blue sub pixel. The light control signal on the data line D2, for example, comprises three sub control signals, which respectively have equivalent wavelengths λ1, λ2, and λ3. However, the light filtering unit 312a is configured to obtain the sub control signal having the equivalent wavelength λ1; the light filtering unit 312b is configured to obtain the sub control signal having the equivalent wavelength λ2; and the light filtering unit 312c is configured to obtain the sub control signal having the equivalent wavelength λ3. That is, the sub control signal having the equivalent wavelength λ1 carries data associated with the red sub pixel; the sub control signal having the equivalent wavelength λ2 carries data associated with the green sub pixel; and the sub control signal having the equivalent wavelength λ3 carries data associated with the blue sub pixel. It should be noted that the equivalent wavelengths λ1 to λ3 are user-defined wavelengths, and are not necessarily wavelengths actually corresponding to red light, green light, and blue light.

In an embodiment, the sub control signals are provided to the data line D2 at the same time. The light filtering units 312a, 312b, and 312c generate corresponding input signals according to different sub control signals, so that photo transistors 314a, 314b, and 314c are conducted in different degrees. In this case, the photo transistors 314a, 314b, and 314c in a same column respectively write different data into pixel capacitors C1 to C3 on the basis of a voltage level on the scan line S1. In other words, in this embodiment, 9 pixel units in FIG. 2 update at the same time. Due to correspondence between light filtering units and equivalent wavelengths, the pixel units can perform action according to different signals. Because pixel units in different rows can update at the same time, an update rate of the display panel is improved. On the other aspect, because pixel units in different rows are electrically connected to a same wire, a quantity of fan-out cables of the panel is reduced, and a bezel width of the panel is reduced. In another embodiment, the sub control signals are provided to the data line asynchronously. By means of the correspondence between the light filtering units and the equivalent wavelengths in cooperation with time-sharing control, it can be ensured that each pixel unit is driven by a correct signal.

Figure 3:
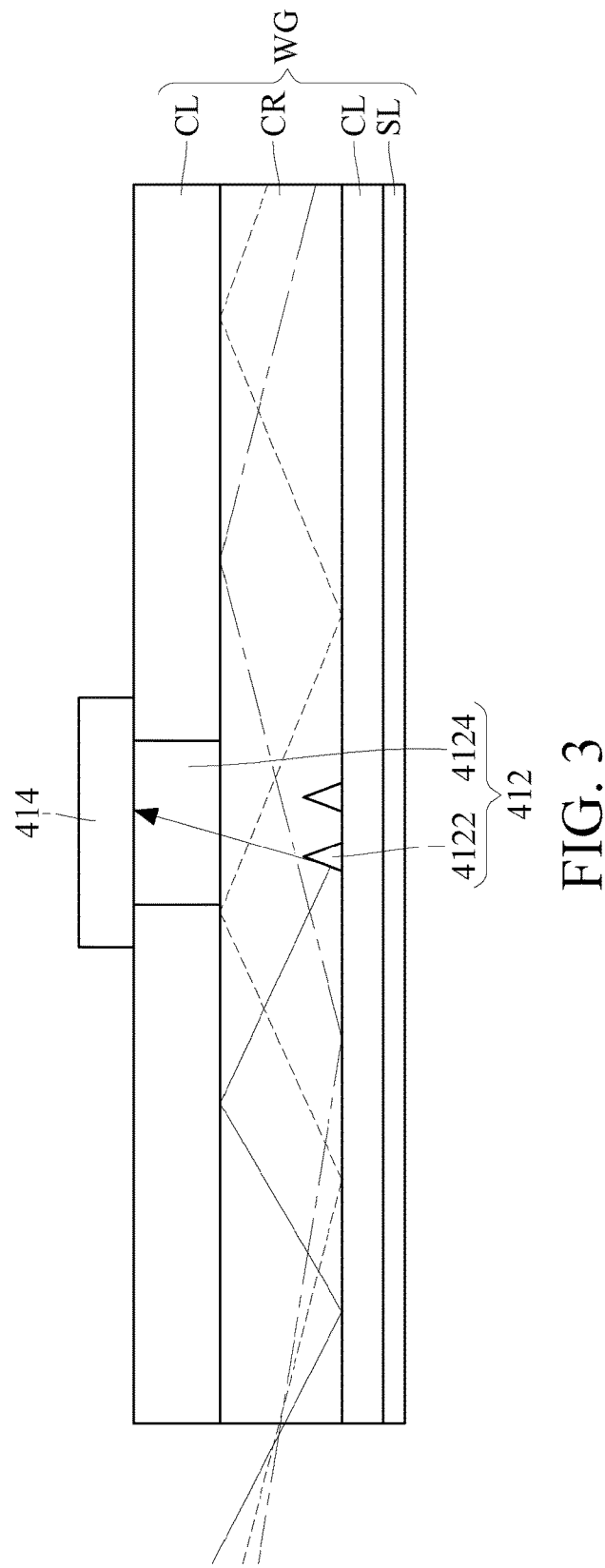
FIG. 3 is a schematic structural diagram of a light filtering unit according to an embodiment of the present invention.

Next, referring to FIG. 3 to describe an implementation aspect of a light filtering unit. FIG. 3 is a schematic structural diagram of a light filtering unit according to an embodiment of the present invention. A waveguide WG, a light filtering unit 412, and a photo transistor 414 are drawn in FIG. 3. For briefness of narration, brief geometric figures are used to represent the elements. In other words, FIG. 3 is used only for illustration, and is not used to limit shapes and relative locations of the elements faithfully. As shown in FIG. 3, the waveguide WG comprises a core layer CR, a cladding layer CL, and a shield layer SL. The cladding layer CL coats at least a part of the core layer CR; the core layer CR and the cladding layer CL are located on the shield layer SL. A refractive index of the core layer CR is greater than that of the cladding layer CL. The light filtering unit 412 comprises a light guide piece 4122 and a light filtering piece 4124. The light guide piece 4122 is provided on the core layer CR, and the light filtering piece 4124 is provided on the cladding layer CL. In an embodiment, the light filtering piece 4124 is exposed to the cladding layer CL, and a third end of the photo transistor 414 is provided towards the light filtering piece 4124 exposed to the cladding layer CL.

In an embodiment, the light guide piece 4122 is similar to a microstructure on a light guide plate in a backlight module. The light guide piece 4122 is configured to reflect a partial amount of light in a light control signal to the light filtering piece 4124. From another perspective, it is equivalent to that the light filtering piece 4124 receives the light control with partial intensity, and an optical signal with abundant intensity is still transmitted to a next pixel along the core layer CR. Then the light filtering piece 4124 obtains a corresponding sub control signal from received light, and provides an input signal to the photo transistor 414 according to the obtained sub control signal. In this embodiment, the light control signal, for example, is visible light, and the light filtering piece 4124, for example, is a filter to filter out light with a corresponding wavelength range. However, in another embodiment, the light guide piece 4122, for example, is a periodic grating. By adjusting a period of the grating, light having the wanted wavelength can be selectively diffracted to the light filtering piece 4124. However, the light filtering piece 4124 is configured to further filter out a corresponding sub control signal in an optical signal to provide an accurate sub control signal.

Figure 4:
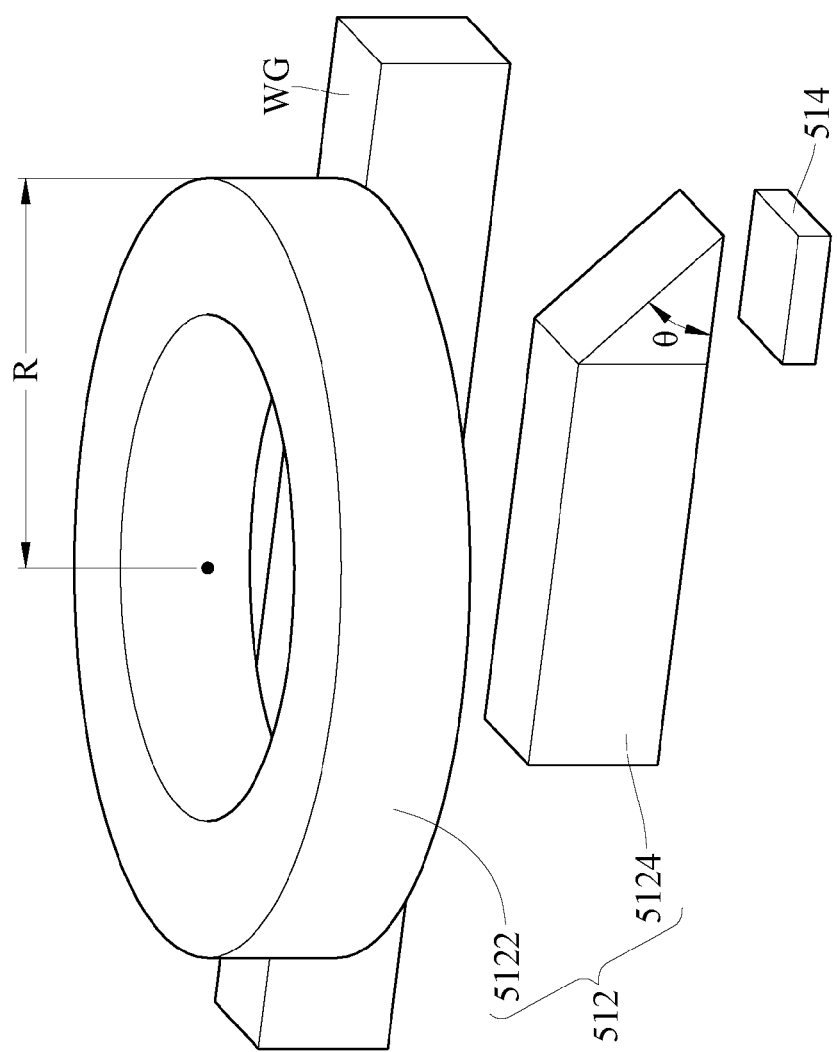
FIG. 4 is a schematic structural diagram of a light filtering unit according to another embodiment of the present invention.

Then referring to FIG. 4, FIG. 4 is a schematic structural diagram of a light filtering unit according to another embodiment of the present invention. A light filtering unit 512 comprises a resonance part 5122 and a light guide part 5124. The resonance part 5122, for example, is an annular resonator or a dish-like resonator, and in this and subsequent embodiments, description is made by using that the resonance part 5122 is an annular resonator. In this embodiment, a physical part of the resonance part 5122 covers a part of a waveguide WG and a part of the light guide part 5124, and the light guide part 5124 covers at least a part of a photo transistor 514. The resonance part 5122 is configured to generate an optical input signal according to a sub control signal of a light control signal in the waveguide WG, and provide the optical input signal to the light guide part 5124. One end of the light guide part 5124 has a light guide angle θ. By adjusting the light guide angle θ, the optical input signal can be accurately transmitted to the photo transistor 514, and the light guide angle θ may be, for example, set to be no less than 40 degrees and no greater than 50 degrees. The resonance part 5122 has a resonance radius R, which may be expressed as $$R = \frac{m\lambda_1}{2\pi},$$

wherein m is a positive integer; λ1 is an equivalent wavelength of a sub control signal obtained from a light control signal; and π is the circumference ratio.

Figure 5A:
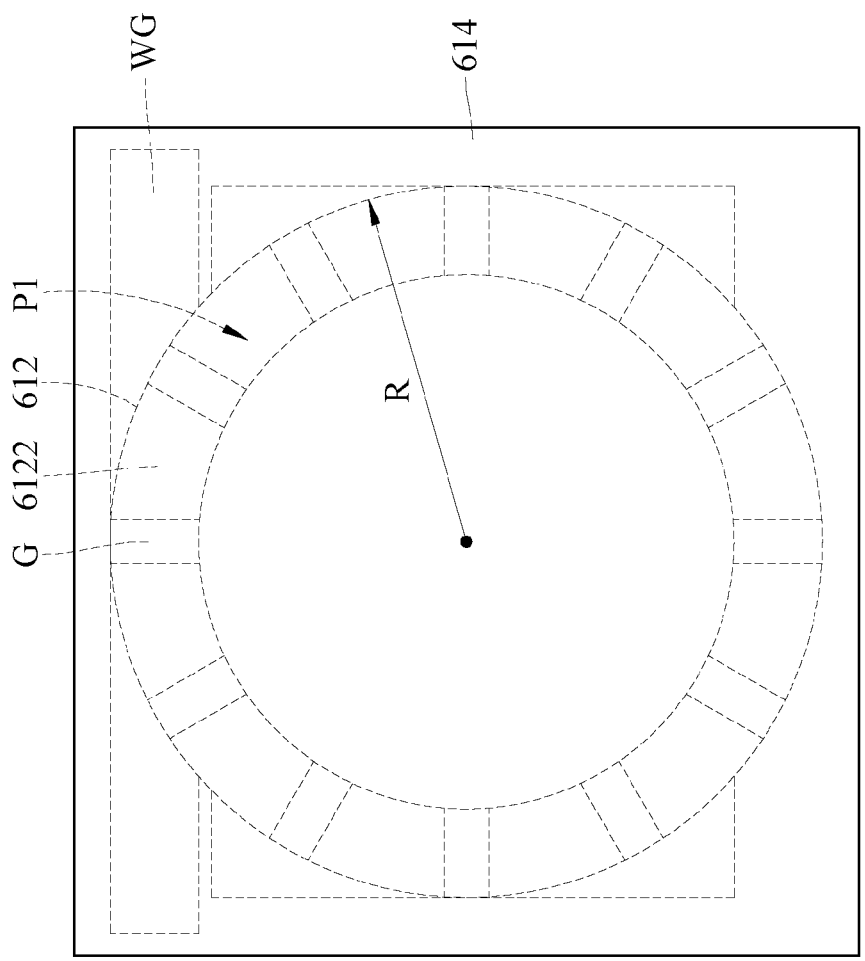
FIG. 5A is a schematic structural diagram of a light filtering unit according to a further embodiment of the present invention.
Figure 5B:
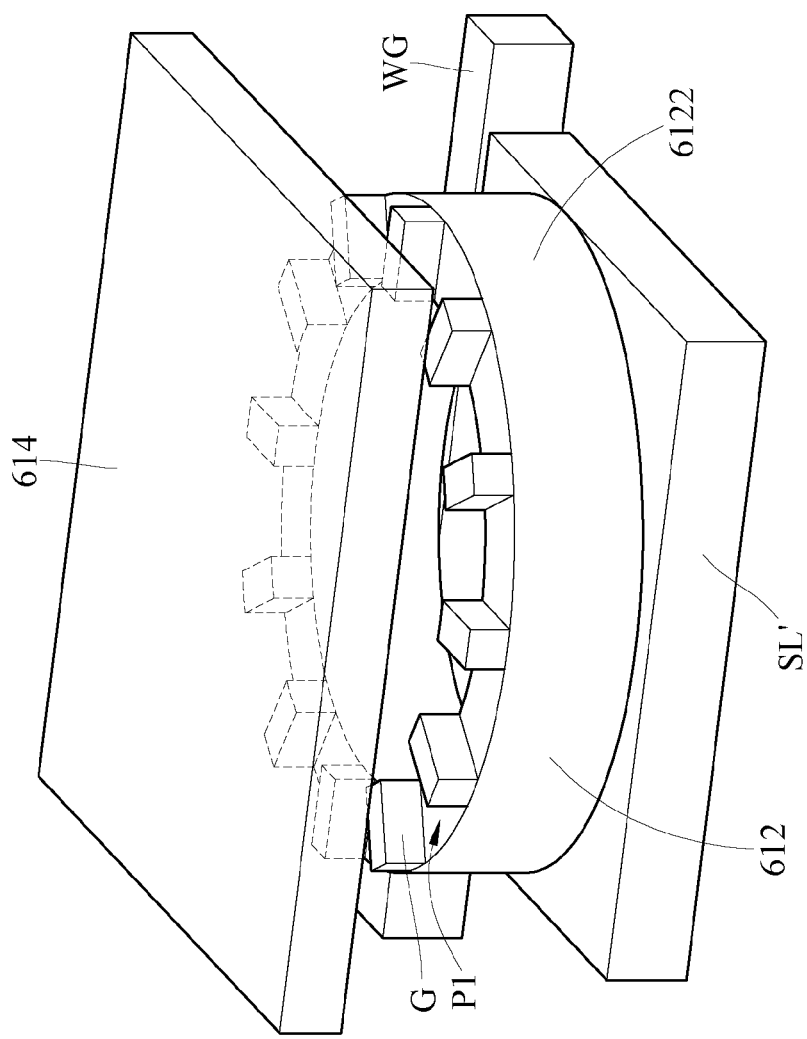
FIG. 5B is a schematic diagram of a location of a light filtering unit drawn in FIG. 5A relative to other elements.

Next referring to FIG. 5A and FIG. 5B, FIG. 5A is a schematic structural diagram of a light filtering unit according to a further embodiment of the present invention, and FIG. 5B is a schematic diagram of a location of a light filtering unit drawn in FIG. 5A relative to other elements. As shown in FIG. 5A, a light filtering unit 612 is an annular resonator, and comprises a resonance part 6122 and a plurality of gratings G. More specifically, the resonance part 6122 comprises a first annular surface P1. The first annular surface P1 faces a photo transistor 614. The gratings G are located on the first annular surface P1. The gratings G are arranged on the first annular surface P1 at equal intervals, and the equal interval is $$\frac{\lambda_1}{2n_{\mathit{eff}}}.$$

$\lambda_1$ is an equivalent wavelength in a wavelength range corresponding to the light filtering unit 612, and $n_{\mathit{eff}}$ is an equivalent refractive index of the light filtering unit 612, which is coupled to a photo transistor. In another embodiment, the light filtering unit 612 may also be a dish-like resonator. However, as shown in FIG. 5B, the light filtering unit 612 is configured between the photo transistor 614 and a light shield layer SL'. An entity part of the light filtering unit 612 is overlapping with a part of a waveguide WG and a part of the photo transistor 614. The first annular surface P1 of the light filtering unit 612 faces the photo transistor 614, to provide an optical input signal to the photo transistor 614. In this embodiment, the photo transistor 614 is located above the light filtering unit 612; a light receiving surface of the photo transistor 614 may directly face the gratings G and the first annular surface P1. Therefore, an optical signal with the wavelength λ1 in the light filtering unit 612 may be guided out in a direction perpendicular to structures of the gratings G, so that the photo transistor 614 can receive or effectively sense specific wavelengths more easily.

Figure 6A:
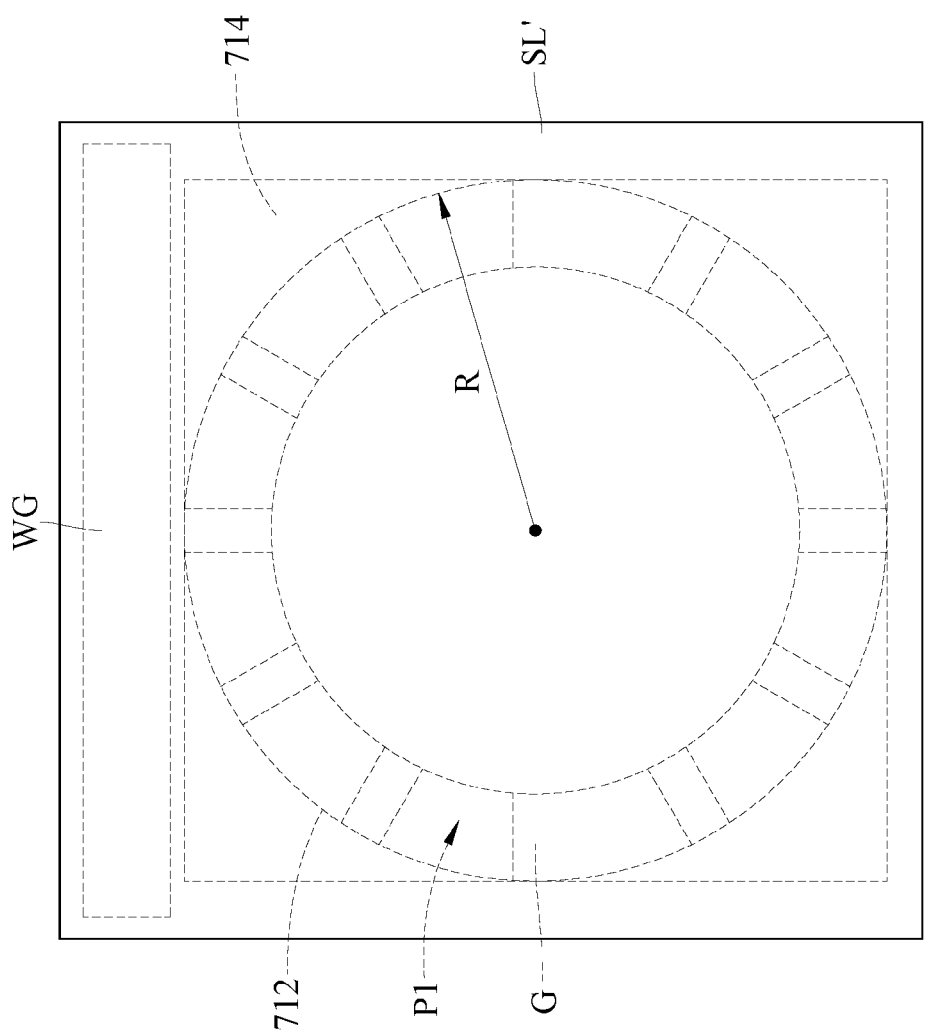
FIG. 6A is a schematic structural diagram of a light filtering unit according to a further embodiment of the present invention.
Figure 6B:
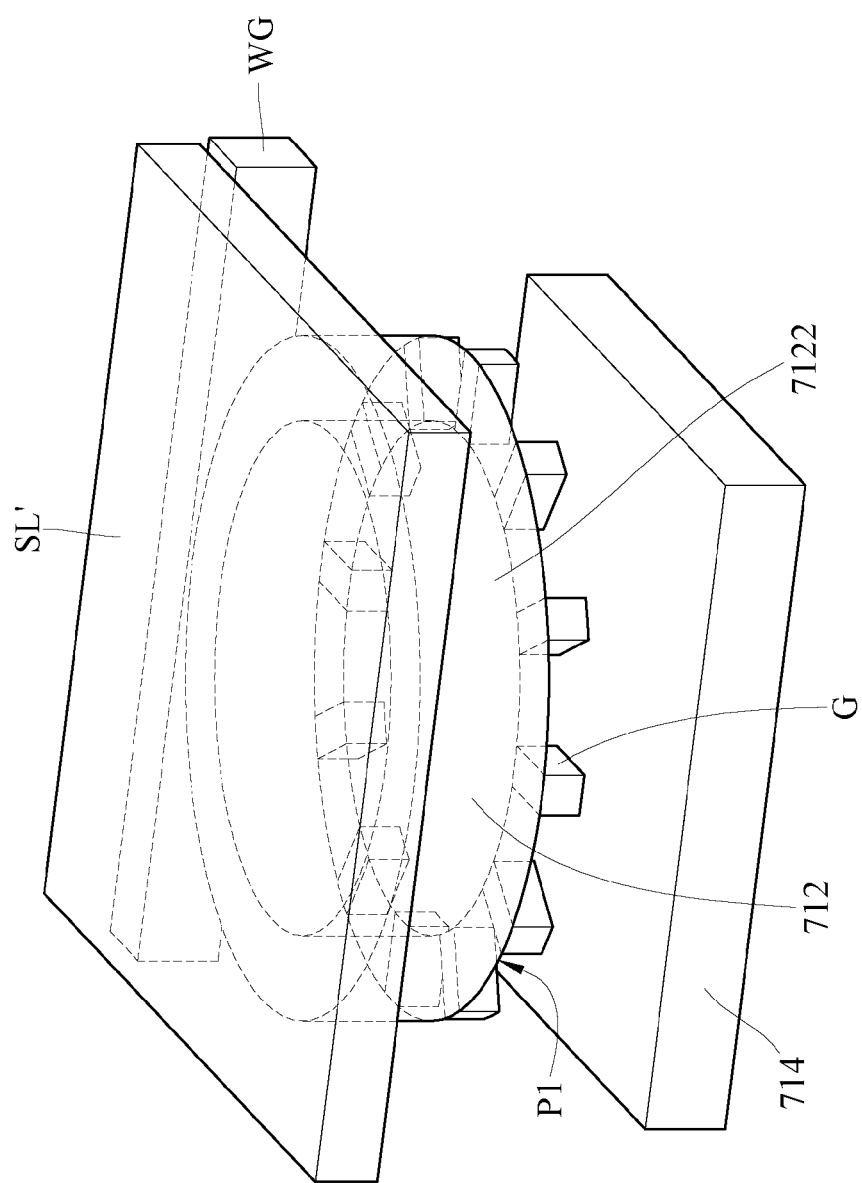
FIG. 6B is a schematic diagram of a location of a light filtering unit drawn in FIG. 6A relative to other elements.

Referring to FIG. 6A and FIG. 6B together, FIG. 6A is a schematic structural diagram of a light filtering unit according to a further embodiment of the present invention, and FIG. 6B is a schematic diagram of a location of a light filtering unit drawn in FIG. 6A relative to other elements. As shown in FIG. 6A, a light filtering unit 712 is an annular resonator, and comprises a resonance part 7122 and a plurality of gratings G. More specifically, the resonance part 7122 comprises a first annular surface P1. The first annular surface P1 faces a photo transistor 714. The gratings G are located on the first annular surface P1. The gratings G are arranged on the first annular surface P1 at equal intervals, and the equal interval is $$\frac{\lambda_1}{2n_{\mathit{eff}}}.$$

$\lambda_1$ is an equivalent wavelength in a wavelength range corresponding to the light filtering unit 712, and $n_{\mathit{eff}}$ is an equivalent refractive index of the light filtering unit 712 coupled to a photo transistor. In another embodiment, the light filtering unit 712 may also be a dish-like resonator. However, as shown in FIG. 6B, the light filtering unit 712 is configured between the photo transistor 714 and a light shield layer SL'. An physical part of the light filtering unit 712 is overlapping with a part of the photo transistor 714. A waveguide WG is adjacent to the light filtering unit 712 and is coupled to the light filtering unit 712. The first annular surface P1 of the light filtering unit 712 and the gratings G face the photo transistor 714 in order to provide an optical input signal to the photo transistor 714.

Figure 7A:
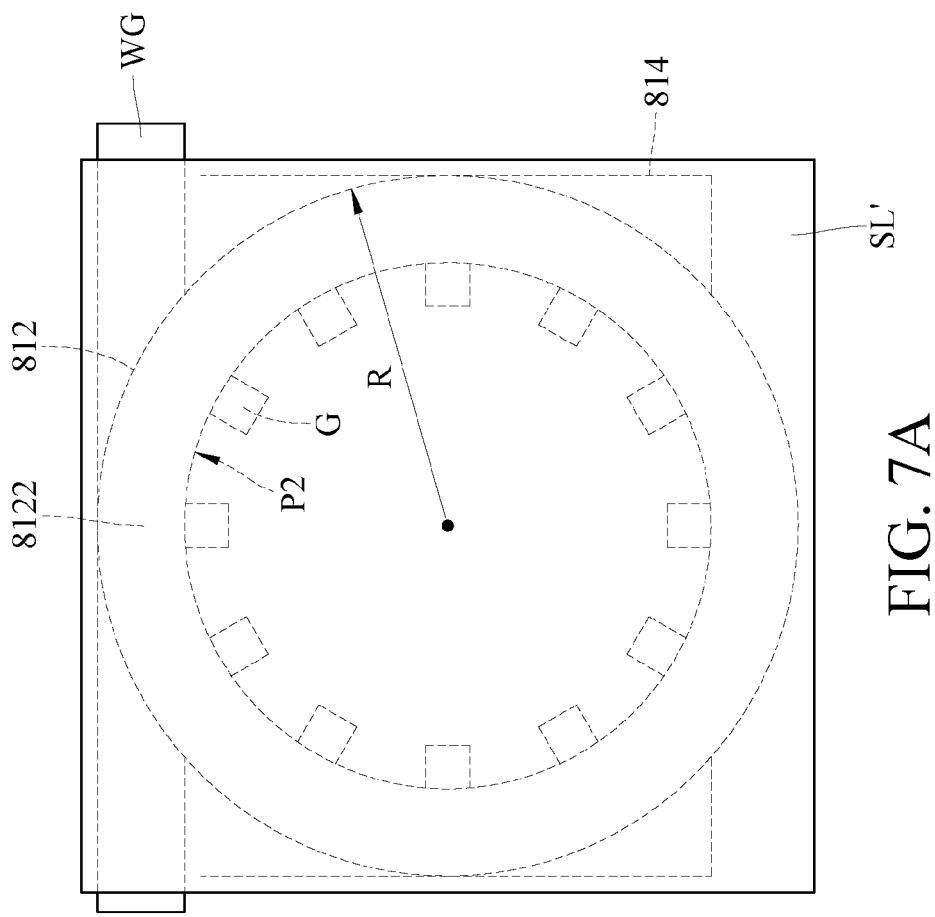
FIG. 7A is a schematic structural diagram of a light filtering unit according to a further embodiment of the present invention.
Figure 7B:
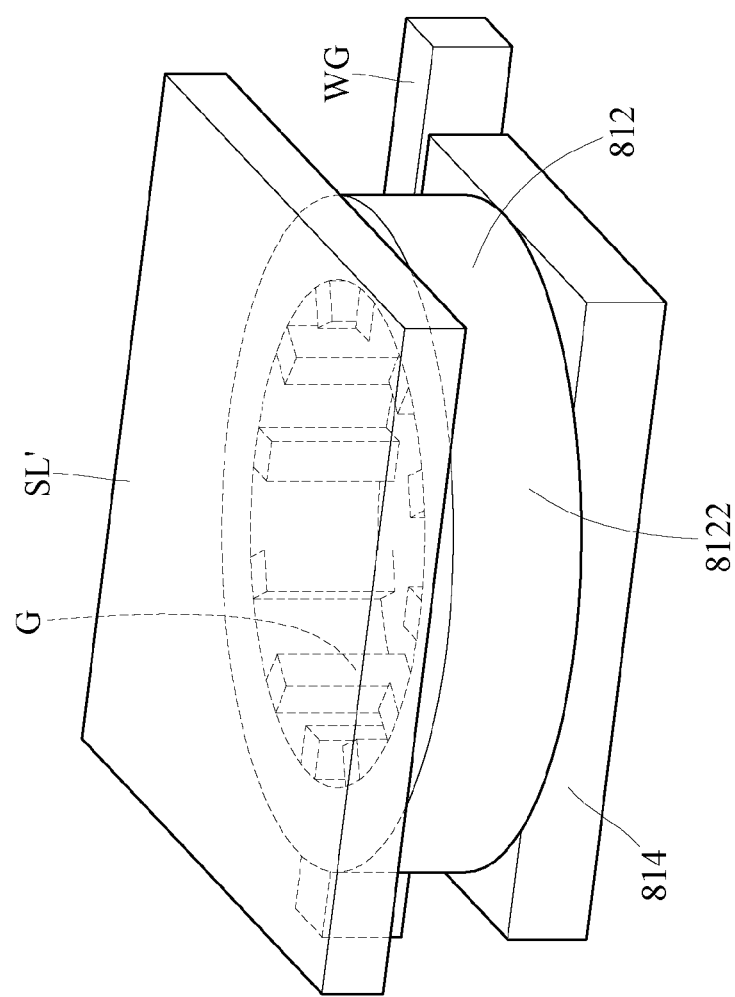
FIG. 7B is a schematic diagram of a location of a light filtering unit drawn in FIG. 7A relative to other elements.
Figure 7C:
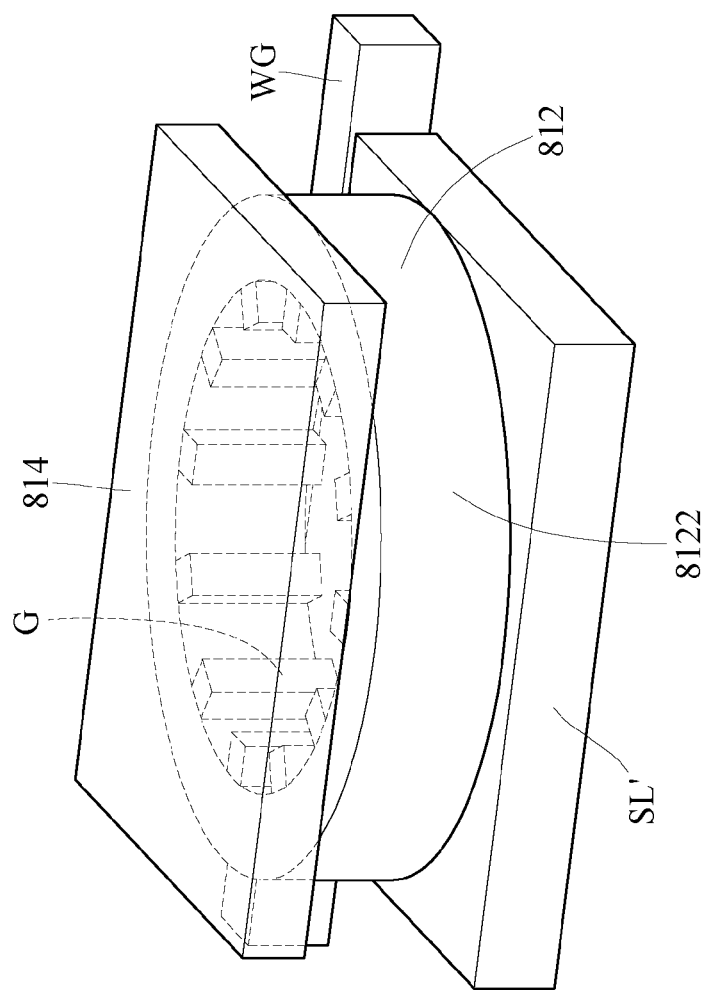
FIG. 7C is a schematic diagram of another location of a light filtering unit drawn in FIG. 7A relative to other elements.

Then referring to FIG. 7A, FIG. 7B, and FIG. 7C, FIG. 7A is a schematic structural diagram of a light filtering unit according to a further embodiment of the present invention; FIG. 7B is a schematic diagram of a location of a light filtering unit drawn in FIG. 7A relative to other elements; and FIG. 7C is a schematic diagram of another location of a light filtering unit drawn in FIG. 7A relative to other elements. As shown in FIG. 7A, a light filtering unit 812 is an annular resonator, and comprises a resonance part 8122 and a plurality of gratings G. More specifically, the resonance part 8122 comprises an inner circumferential lateral P2. The gratings G are located on the inner circumferential lateral P2. The gratings G are arranged on the inner circumferential lateral P2 at an equal interval, and the equal interval is $$\frac{\lambda_1}{2n_{\mathit{eff}}}.$$

$\lambda_1$ is an equivalent wavelength in a wavelength range corresponding to the light filtering unit 812, and $n_{\mathit{eff}}$ is an equivalent refractive index of the light filtering unit 812 coupled to a photo transistor. However, as shown in FIG. 7B and FIG. 7C, the light filtering unit 812 is configured between the photo transistor 814 and the light shield layer SL', and the photo transistor 814 and the light shield layer SL' are respectively located above or below the light filtering unit 812, which is not limited. An physical part of the light filtering unit 812 is overlapping with a part of a wave guide WG and a part of the photo transistor 814, and the light filtering unit 812 can axially guide an optical signal to the photo transistor 814 helically.

Based on the above, certain embodiments of the present invention provide a display panel. A photo transistor and a light filtering unit are provided in each pixel unit of the display panel. In this way, a waveguide can be used as a scan line or a data line of the display panel, that is, a drive signal or a data signal of the display panel is transmitted by means of light. Under the photoelectric architecture, a quantity of wires of the display panel can be reduced, so that an effect of non-ideal coupling among electric elements is avoided. In addition, performing transmission by using an optical signal can further alleviate the impedance problem faced during transmission by using an electric signal. On the other aspect, because light with different wavelengths is independent from each other, and does not interference with each other in transmission, signals that originally correspond to a plurality of electric channels may be converted into optical signals and are transmitted on a common waveguide, so as to reduce a quantity of signal lines, thereby solving problems such as limited peripheral fan-out space and increase of a bezel width. In addition, the waveguide may be a transparent material in replacement of a non-transparent electrode line, so as to improve an aperture opening ratio of a pixel.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:
1. A display panel, comprising:
a plurality of waveguides, respectively configured to transmit a plurality of light control signals, wherein each of the plurality of light control signals comprises at least one sub control signal, and the at least one sub control signal corresponds to at least one wavelength range;
a plurality of wires, respectively configured to transmit an electric control signal, wherein the wires and the waveguides are arranged to intersect with one another; and
a pixel array, comprising a plurality of pixel units arranged in a plurality of columns and a plurality of rows, wherein each of the plurality of pixel units comprises:

a pixel electrode;
a light filtering unit, coupled to one of the waveguides, wherein the light filtering unit is configured to receive the sub control signals from the waveguide to which the light filtering unit is coupled, and to select at least one of the received sub control signals as an optical input signal; and
a photo transistor, comprising a first end, a second end, and a control end, wherein the first end is electrically connected to the pixel electrode, the second end is electrically connected to one of the wires, the control end is coupled to the light filtering unit, and the photo transistor is electrically connected to the pixel electrode;
wherein the light filtering unit of each of the plurality of pixel units further comprises:
a resonance part; and
a plurality of gratings arranged on the resonance part at equal intervals,
wherein the interval is $$\frac{\lambda_1}{2n_{eff}},$$

$\lambda_1$ is a specific wavelength in the wavelength range corresponding to the light filtering unit, and $n_{eff}$ is an equivalent refractive index of the light filtering unit coupled to the photo transistor.

2. The display panel according to claim 1, wherein the plurality of light control signals are visible light signals; the light filtering unit of each of the plurality of pixel units comprises a filter, and the filters respectively correspond to different wavelength ranges.

3. The display panel according to claim 1, wherein the resonance part has a resonance radius R; the resonance radius R is expressed as $$R = \frac{m\lambda_1}{2\pi};$$

m is a positive integer, and $\pi$ is a circumference ratio.

4. The display panel according to claim 1, wherein the resonance part comprises a first annular surface, which faces the photo transistor of one of the plurality of pixel units, and the gratings are located on the first annular surface.

5. The display panel according to claim 1, wherein the resonance part comprises an internal circumferential lateral, and the gratings are located on the internal circumferential lateral.

6. The display panel according to claim 1, wherein the photo transistor is configured to be selectively conducted according to the optical input signal, and charge the pixel electrode according to the electric control signal.

7. The display panel according to claim 6, wherein the waveguides are respectively coupled to one of the plurality of rows of the pixel array; the wires are respectively electrically connected to one of the plurality of columns of the pixel array; each of the waveguides is coupled to one row of the pixel array, and each of the wires is electrically connected to one column of the pixel array.

8. The display panel according to claim 6, wherein the waveguides are respectively coupled to one of the plurality of columns of the pixel array; the wires are respectively electrically connected to one of the plurality of rows of the pixel array; each of the waveguides is coupled to one column of the pixel array, and each of the wires is electrically connected to one row of the pixel array.

9. The display panel according to claim 6, wherein each of the plurality of waveguides is coupled to one column of the pixel array, and each of the plurality of wires is electrically connected to more than one of rows of the pixel array.

10. The display panel according to claim 9, wherein each of the plurality of light control signals comprises a plurality of sub control signals, which respectively correspond to a plurality of different wavelength ranges; the light filtering unit of each of the plurality of pixel units is configured to generate the corresponding optical input signal according to one of the sub controls signals that has a specific wavelength range.

* * * * *